Nov. 22, 1927.
W. C. BROWN ET AL
1,650,490
PLANIMETER
Filed Sept. 13, 1926
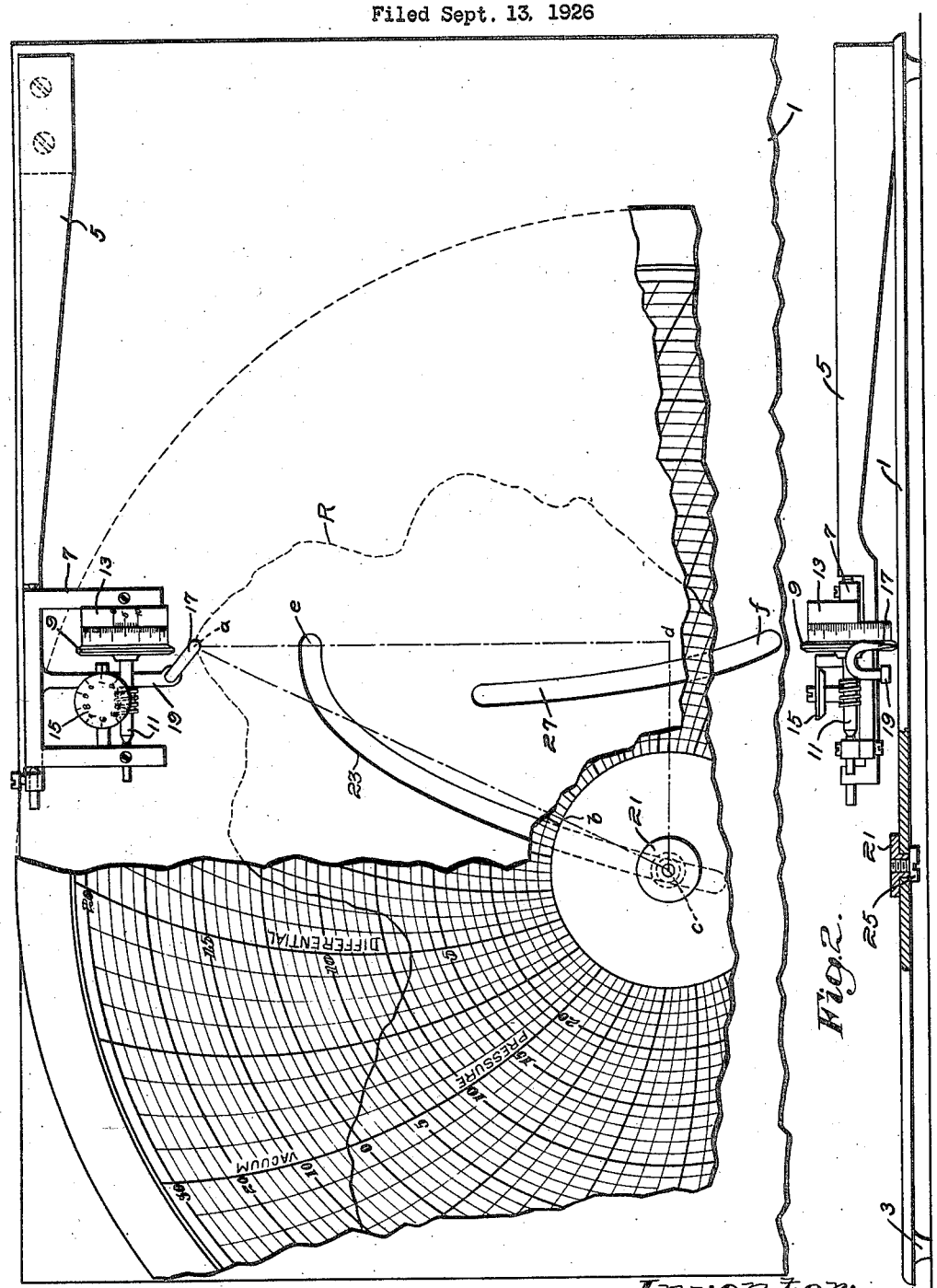

Patented Nov. 22, 1927.

1,650,490

UNITED STATES PATENT OFFICE.

WILLIS C. BROWN AND LELAND K. SPINK, OF TULSA, OKLAHOMA, ASSIGNORS TO THE FOXBORO COMPANY, OF FOXBORO, MASSACHUSETTS, A CORPORATION OF MASSACHUSETTS.

PLANIMETER.

Application filed September 13, 1926. Serial No. 135,003.

This invention relates to planimeters of the radial type. Instruments of this kind designed to determine the average radius of an irregular curve such as is traced by the pen of a recording instrument are well known and commonly used. The object of the present invention is to provide an instrument of this general type adapted to determine not the average value of the instantaneous values indicated by the points of the curve but the average of some function of said values as, for instance, the square root. In the measurement of the flow of fluids by orifice meters and the like a pressure or pressures existing in the fluid are recorded and the rate of flow, Q, is deduced therefrom by means of the formula $Q = C \sqrt{hP}$ wherein $h$ is the differential pressure and $P$ the absolute static pressure on the downstream side of the orifice plate. Our invention may be utilized in connection with a record made by an orifice meter or the like to facilitate the computation of the rate of flow and for convenience we shall in the following description treat specifically of an instrument for determining the average square root although obviously the integration of any other non-linear function of a recorded variable, whether algebraic, transcendental or logarithmic, might be effected in similar manner.

Our invention will be readily understood by reference to the following description of the illustrative embodiment thereof shown by way of example in the accompanying drawings, wherein:

Fig. 1 is a plan of an illustrative planimeter embodying the invention partly broken away and having a recording instrument chart thereon, the chart also being broken away; and Fig. 2 is a side elevation of the instrument broken away to show part in section.

As an example of the invention we here show an instrument wherein the measuring wheel and the tracer point are stationary and the chart is both revolved and slid beneath them.

Referring to the drawings, the planimeter shown embodies a table 1 provided with feet 3 at the corners. The chart or a portion thereof may rest on the upper face of this table. To support the measuring mechanism of the apparatus there may be provided an arm 5 having one end fast to the upper surface of the table adjacent one corner. This arm extends parallel to an edge of the plate toward a point substantially midway between its ends in overhanging relation thereto to leave a space between the free end portion of the arm and the plate to permit the insertion of the chart therebeneath, as more fully hereinafter described. The free end of the arm is recessed to receive a U-shaped rocking frame 7 having a needle fulcrum connection with said arm and projecting laterally therefrom toward the center of the plate. On this frame is mounted a measuring wheel 9 graduated in appropriate units, the wheel being fast on a shaft 11 journalled in bearings in the frame. A vernier plate 13 is secured to the frame and may be read in connection with the measuring wheel in the usual manner. A counter 15 driven from the shaft 11 may be utilized to register complete rotations of the wheel. To follow the curve traced upon the chart a suitable tracer is provided, herein shown as a goose-neck tracer finger 17 mounted in an arm 19 extending from the main arm 5 referred to and having its end presented closely adjacent the upper face of the table preferably in the plane of wheel 9 and at a fixed distance therefrom.

In Fig. 1 there is shown a portion of a recording instrument chart of usual form plotted in polar coordinates and bearing thereon a curve R such as would be traced thereon by the pen of a recording instrument. The radially extending lines indicate intervals of time and the circles intervals of pressure or some other variable. In operation the chart is placed on the table beneath the measuring wheel so that the latter is driven by the friction of the chart as it is moved underneath the tracer point 17 in such manner that the tracer point 17 will follow the curve R. To position the chart and provide for its rotation underneath the tracer point and its sliding movement to permit the tracer to follow the curve R as it approaches or recedes from the center, the usual central opening of the chart which fits the clock driven spindle of the recording instrument may fit over a button or hub 21 (seen Fig. 2) having a shank guided in a slot 23 in the plate and held in position in the slot by a screw 25 having a head somewhat larger than the width of the slot. The chart may thus be rotated about the axis of the button 21 and may be slid over the face of the plate beneath the tracer point 17 as guided by the button and slot.

The slot 23 is of curvilinear form, as will be more fully described hereinafter, in order to permit the mechanism to compute the average value of some function of the values of the variable recorded on the chart by the curve R. The slot 23 which is here shown is adapted to cooperate with the graduations of a chart having a zero circle adjacent the center and whereon the values of the variable increase outwardly toward the periphery of the chart.

We have described in a general way the mechanical construction of the instrument shown. An understanding of its method of operation will be facilitated by the preliminary consideration of certain abstract principles. An infinitesimal arc of a curve is measured by the length of the tangent of the arc. If a measuring wheel rolls around a curve in a position constantly tangent thereto, the movement of a point on the circumference of the wheel will measure the length of the curve and the length of the curve is, of course, equal to its average radius multiplied by 2 pi. The travel of the wheel is the number of the revolutions thereof multiplied by its radius and by 2 pi. Hence the number of revolutions will be proportional to the average radius of the curve.

In the instrument herein shown the chart is moved under the wheel 9 and the tracer point to permit the latter to follow the curve and the chart is so guided by the curvilinear slot 23 that the angular position of the wheel with reference to the radial lines on the chart is changed in a predetermined manner, so that the radius of the curve along which the wheel is momentarily moving in the direction of the tangent to the curve is definitely related to the actual radius on the chart corresponding to the position of the tracer point. This is effected by the shape of the slot 23.

For convenience we shall first describe the principle of this curvilinear slot, considering merely geometrical distances between the various points of the apparatus as measured in standard units, for instance, inches, and will thereafter indicate such modifications as may be utilized in practice.

Referring, therefore, to Fig. 1 and referring to the lettered distances thereon in standard units, the actual radius of the curve which it is desired to integrate is, for any given position of the chart, the length $a$—$b$ as marked in Fig. 1, $b$—$c$ being the radius of the zero circle and a constant. The distance $a$—$c$ between the tracer point and the center of the hub or button 21 is, in other words, a linear function of the radius $a$—$b$, all the quantities being expressed in inches or some other standard unit. The curve of slot 23 may be such that the perpendicular distance $c$—$d$ from the instantaneous center of revolution of the chart at a point along the center line of the slot 23 to the line $a$—$d$ at the intersection of the plane of the measuring wheel with the table 1 is proportional to the square root of $a$—$b$ or, specifically, equal to such square root. That is, if $a$—$b$ were four inches, $c$—$d$ might be two inches. Hence, the wheel is moving at any given instant tangentially along a curve having a radius $c$—$d$ proportional to, or, as suggested, equal to, the square root of the radius $a$—$b$ on the chart determined by the center of the chart at $c$ and the position of the tracer point 17 at $a$ and the linear travel of a point on the circumference of the measuring wheel will measure not the average of the radii on the chart but the average of the square roots of those radii.

Since, however, the registering mechanism of the wheel records the revolutions and not the linear travel of a point in the circumference of the wheel, it might be desired to have a registration of the average length of the radii. This could be effected by introducing a suitable constant factor in the distance $c$—$d$. To put the matter differently, if the curve 23 is so laid out that the distance $c$—$d$ is equal to the numerical value of the square root of $a$—$b$ expressed in units equal to the radius of the measuring wheel, the reading of the wheel would give the direct value of the average of the square roots of the radii of the curve. To illustrate by the simple numerical example already given, if $a$—$b$ were four inches and $c$—$d$ were equal to the square root of four multiplied by the radius of the measuring wheel, that is, twice the radius, then, if the chart were revolved in a circle in the position shown, the wheel would trace a circle, the effective component of the radius of which, acting tangentially to the wheel, would be twice the radius of the wheel and the linear travel of a point in the circumference of the wheel would be 4 pi times the wheel radius and the number of revolutions would be 2, that is, the square root of 4.

In the practical use of an instrument of this sort the registered result is for purposes of further computation usually multiplied by some constant factor and it is therefore relatively unimportant to have a direct reading, and any necessary correction factor may be combined, once for all, with such constant factor. The explanation just given has had for a primary purpose to facilitate the understanding of what will follow and to point out that in laying out the curve any constant factor desirable for constructional or other reasons may be introduced in the distance $c-d$, a suitable compensating factor being utilized, if desired, in connection with the reading of the measuring wheel in order to obtain the desired value of the integral.

In the above description consideration has been given to the distances between the various parts of the mechanism as expressed in terms of some standard unit. In many types of recording instruments, however, equal increments of the variable being measured do not affect equal displacements of the measuring pen along the chart. In other words, the spacing of the unit circles along the chart is not uniform. We are interested, however, in the average of the numerical values expressed by the radii of the curve, for instance, the average pressure in pounds per square inch. To permit such a measurement of a non-uniform chart the curve 23 may be so laid out that the distance $c-d$ is equal to the square root of the numerical value in units of a suitable size of the radius $a-b$, irrespective of the linear measurement of $a-b$. Thus, for instance, if $a-b$ represented 64 pounds pressure, we would disregard the length of the line $a-b$ in inches and lay off $c-d$ equal to 8 units, that is, the square root of $c-d$, and these units might be chosen with considerable arbitrariness. If, for example, they were equal to the radius of the measuring wheel the registration of the number of revolutions of the measuring wheel would give a direct reading of the average square root of the radii on the chart expressed in pounds per square inch. The size of the units, however, will be dictated by reasons of constructional design and any suitable modifying factor may be here introduced, being compensated for by the use of a modifying factor which is multiplied into the registered reading.

To determine the form of the slot 23 in accordance with these principles the following proceeding may be utilized. From the point $a$ directly beneath the tracer point circles are described having radii equal to those of the scale circles on the chart, as $a-c$ in the drawing. Points along the center line of the slot where it intersects these circles are determined as follows. Extract the square root of the numerical value of the circle. In other words, determine the square root of the distance $a-b$ as measured in arbitrary units, uniform or non-uniform, and draw a line parallel to $a-d$ and distant therefrom a distance expressed by this root in any suitable chosen unit of measurement, in which may be incorporated the radius of the measuring wheel 9 and any suitable constant to be introduced for constructional reasons. The intersection of this line and the corresponding circle is a point on the center line of the slot 23.

We shall hereafter in the claims use the expression "the numerical value", for example, when referring to a given radius, to signify the value thereof expressed in units proportional to those of the variable measured by the recording instrument whether or no corresponding to uniform units of linear measure.

The intersection at $e$ of the center line of the curve 23 with line $a-d$ may be so located that the distance $a-e$ is equal to the distance $c-b$, the radius of the zero circle of the chart. Thus, with the hub 21 at the extreme upper end of the slot, viewing Fig. 1, the axis of the chart coinciding with the point $e$, the tracer point will rest on the zero circle and the wheel will be in a radial position. A revolution of the chart so that the tracer follows the zero circle will thus effect no movement of the measuring wheel, which is the desired result.

In laying out the curve as above described the radius of the measuring wheel and any constant which may be introduced should be so chosen that the curve will not cross the perpendicular to the line $a-d$ at the point $e$ as otherwise true values would not be readable on the wheel. Specifically in cases where the radius of the zero circle $b-c$ is one inch, the product of such constant and the diameter of the measuring wheel 9 should not be greater than .800 of an inch.

While the measuring action of the instrument has been described by reference to the circles on the chart, it is obvious that the movement of the recording pen relative to the center of the chart is significant and not the figures which are printed on the paper. The instrument averages the square roots of the instantaneous radial distances of the pen from the circle of origin in units of a certain size, either uniform or non-uniform. Conveniently the range of movement of the pen may be divided decimally and the curve so determined that the registration of the instrument would be very simply related to such a division of the range. Thus, assuming a chart having a range from 0 to 100 inches of water, which is very commonly used, we have found it convenient to so proportion the slot that the registration of the wheel will be exactly one-half the average square root of the radii of the circle. This may be effected by laying off the distance $c-d$ in units equal to one-half the radius of the wheel 9. The factor one-half is introduced to avoid the use of an inconveniently small measuring wheel and to give a smooth form to the curve of slot 23, but the compensating multiplying factor, two, is a very simple one. An instrument having such a slot may be utilized with any recording instrument or chart wherein the increase of the variable being measured moves the recording pen outwardly independently of the range of the instrument, provided that the radius of the zero circle is the same and that the movement of the pen obeys the same law. For instance, if the slot is designed to give a direct reading when used with a chart wherein the amplitude of movement of the pen corresponds to a pressure variation of 100 inches of water, $n$, it can nevertheless be used with one in which the same amplitude of pen movement is a different number of units, say $m$. The reading of the planimeter will then be multiplied by an additional factor consisting of a fraction whose numerator is the square root of $m$ and whose denominator is the square root of 100, that is, $f\left(\frac{m}{n}\right)$. It is obvious that the adoption of the decimal base for the slot simplifies these factors. Otherwise expressed, this factor is one-tenth of the square root of $m$, a value readily determined by reference to a table of square roots and by movement of the decimal point.

For many uses, for instance, in the static pressure factor of the formula for flow of gases, it is desired to ascertain the average absolute pressure rather than the average gage pressure. The pen of the recording instrument which responds to static pressure may be set off zero by an amount equal to atmospheric pressure, thus making the zero circuit on the chart represent zero pounds of absolute pressure. If however, only a close approximation is desired, the pen may be left to read gage pressure and a suitable correction applied to the planimeter reading.

Certain types of recording instrument are so arranged that the pen moves inwardly toward the center of the chart as the value of the variable increases. These are sometimes known as reverse reading instruments. Particularly in the measurement of flow of gases by orifice meters and the like the pipe line is frequently under suction and the static pressures under which the meter operates are vacuum pressures, that is, negative gage pressures. In Fig. 1 of the drawings there is shown a fragment of a commonly used compound chart such as is utilized on two pen instruments which record on a single chart both the differential pressure set up by an orifice meter and the static pressure. The chart shown is adapted to have recorded thereon a differential pressure of from zero to twenty units, inches of water, increasing in value outwardly, and a static pressure of from thirty inches of mercury, vacuum by gage pressure, that is approximately zero absolute pressure, increasing inwardly to twenty-five pounds positive gage pressure. In this static range the pressure units are really an emergency range, the orifice meters with which an instrument utilizing this chart would be used ordinarily operating under vacuum only.

To permit the measurement of the average value of the square roots of the instantaneous static pressures recorded on the chart shown the table 1 of the instrument may be provided with a slot 27 similar to the slot 23 adapted to receive the button 21 for guiding the chart. The slot 27 intersects the line $a$—$d$ at $f$, the location of the point $f$ being such that if the center of the chart is at $f$ the tracer 17 at $a$ will lie on a circle adjacent the margin of the chart representing one atmosphere vacuum by gage, that is, absolute zero pressure. The curve of the slot 27 may be calculated similarly to the curve of the slot 23 but it leads from its intersection with the line $a$—$d$ inwardly toward the point $a$ instead of away from it, as does the slot 23, to permit of the desired measurement of the reversely reading chart. The values the roots of which are integrated are measured inwardly from the outer circle of origin, that is, are equal to a constant, the radius of that circle minus the distance of the tracer point from the center of the chart. While in the chart illustrated the static pressure is marked in two different units, that is, inches of mercury vacuum and pounds per square inch gage pressure, the numerical values to be integrated will all be taken in pounds per square inch absolute pressure.

It has been explained that the slot 23 is conveniently calculated on the basis of a range of movement of one hundred units. One reason for this is that a commonly used chart is so divided. Another chart which is much used is that partially illustrated in the drawings embodying a differential range of from zero to twenty units and a reversely reading static pressure range. The differential pressure could be measured in the slot 23 calculated on the basis of one hundred units and the proper reading for the scale of twenty units determined by multiplying the reading by the factor one-tenth of the square root of twenty as above described. Since, however, we are interested in the product of the average square roots of the differential and static pressures, it is immaterial in which of the factors of this product the correcting factor appears. The reverse slot 27 may therefore be so proportioned as to measure not the average value of the square roots of the static pressures but this value multiplied by the correction factor referred to. Thus, while the shape of the direct reading slot 23 for a one-hundred unit range is preserved and its simple relation to other ranges, provision is made whereby direct readings of the measuring mechanism without correction factors may be utilized for a widely used type of chart as described.

We have described in detail the particular embodiment of our invention shown by way of example in the accompanying drawings and in order to make the construction and advantages clear we have described in detail the particular type of instrument shown and referred specifically to some of its practical applications. It will be understood, however, that the detailed character of this description has had for its purpose making clear the operation of the embodiment of the invention shown and is not to be understood as limiting the scope thereof.

What we claim as new and desire to secure by Letters Patent we shall express in the following claims:

1. An instrument of the class described comprising a table to receive the chart, a measuring wheel mounted in a fixed plane above the same and adapted to be rolled by frictional contact with the chart, a tracer point located in the plane of the wheel and at a fixed distance therefrom, a curvilinear guideway in the table extending from a point in said plane and defining a series of points, the distances of which from said plane bear a determined relation to the numerical value of their distances from the tracer point, and a device for rotatably supporting the chart movable along the guideway.

2. An instrument of the class described comprising, in combination, a table on which a chart may rest, a hub carried by the table to enter the central opening of the chart, a measuring mechanism comprising a tracer point and a measuring wheel to roll on the chart on relative rotation between the chart and said mechanism about the axis of the hub, said hub and measuring mechanism having a pin and slot connection, the slot being curved whereby the effective radius through which the wheel rolls is determinately varied.

3. An instrument of the class described comprising a support for a chart and a measuring mechanism comprising a measuring wheel to roll on the chart, the two being connected for relative revolution and a curvilinear guide for said support whereby the effective radius through which the wheel rolls is determinately varied.

4. An instrument of the class described comprising, in combination, a table on which a chart may rest, a fixed measuring mechanism comprising a tracer and a measuring wheel to roll on the chart, a center piece permitting the chart to be rotated about its center beneath the tracer and wheel and a curvilinear guide for said center piece whereby the effective radius through which the wheel rolls is determinately varied.

5. An instrument of the class described comprising, in combination, a support for a chart and a measuring mechanism comprising a measuring wheel to roll on the chart and a tracer, said mechanism and support being associated for relative movement, revolving and sliding, between said mechanism and the chart on said support and guiding means to control such movement so that the distance from the instantaneous center of revolution to the plane of the wheel is a non-linear function of the numerical value which is a linear function of the distance between said center and the tracing point.

6. An instrument of the class described comprising, in combination, a support for a chart and a measuring mechanism comprising a measuring wheel to roll on the chart and a tracer, said mechanism and support being connected to permit said chart and mechanism to revolve one relatively to the other about the center of the chart as a center, and a guide to permit said mechanism and center relatively to approach and recede in a determined curvilinear path whereby the instantaneous value of the radius of the curve followed by the wheel is a non-linear function of the numerical value of the distance between the center and the tracing point.

7. An instrument of the class described comprising, in combination, a support for a chart and a measuring mechanism comprising a measuring wheel to roll on the chart and a tracer, said mechanism and support being connected to permit said chart and mechanism to revolve one relatively to the other about the center of the chart as a center, and a guide to permit said mechanism and center relatively to approach and recede along a curve, the form of which is such that the distance from a given point thereof to the plane of the wheel, such distance being expressed in units simply proportional to the radius of the wheel, is a non-linear function of the distance between said point and the tracer minus a constant, such difference being expressed in units of a variable the values of which are to be integrated.

8. An instrument of the class described comprising, in combination, a support for a chart and a measuring mechanism comprising a measuring wheel to roll on the chart and a tracer, said mechanism and support being associated for relative movement, revolving and sliding, between said mechanism and the chart on said support and a first guiding means to control such movement so that the distance from the instantaneous center of revolution to the plane of the wheel is a non-linear function of a value which is proportional to the numerical value of the distance between said center and the tracing point minus a constant and a second guiding means to control such movement so that the like distance is the same non-linear function of a value which is proportional to the numerical value of a constant minus the distance between said center and the tracing point.

9. An instrument of the class described comprising, in combination, a support for a chart and a measuring mechanism comprising a measuring wheel to roll on the chart and a tracer, said mechanism and support being associated for relative movement, revolving and sliding, between said mechanism and the chart on said support and a first guiding means to control such movement so that the distance from the instantaneous center of revolution to the plane of the wheel is a non-linear function of a value which is proportional to the numerical value of the distance between said center and the tracing point minus a constant and a second guiding means to control such movement so that the like distance is the same non-linear function of a value which is proportional to the numerical value of a constant minus the distance between said center and the tracing point modified by a factor inversely proportional to the maximum value of said non-linear function of the first mentioned expression, to wit, distance minus constant.

10. An instrument of the class described comprising a support for a chart and a measuring mechanism comprising a measuring wheel to roll on the chart, the two being connected for relative revolution, a first curvilinear guide for said support extending from a point in the plane of said wheel away from the said wheel and a second curvilinear guide extending from a point in the plane of the wheel toward the said wheel.

11. An instrument of the class described comprising a support for a chart and a measuring mechanism including a tracer, a measuring wheel to roll on the chart and means for registering the revolutions of the wheel, said support and mechanism having connection permitting relative rotation and sliding whereby said tracer may follow a curve on the chart, said connection comprising a first guide controlling the angle between the chart and the plane of the wheel shaped to effect through said registering means an integration of a function of the distances from an inner circle of origin of points on a curve followed by the tracer expressed in a basic number of units, $n$, for the range of the chart and a second guide shaped to effect the integration of a function of the distances of points of a curve from an outer circle of origin and registration thereof in a desired number of units relative to the range of the chart modified by a factor which is the first said function of a second basic number of units, $m$, divided by $n$, that is $$f\left(\frac{m}{n}\right).$$

In testimony whereof, we have signed our names to this specification.

WILLIS C. BROWN.
LELAND K. SPINK.